(12) United States Patent
Van Deurse et al.

(10) Patent No.: US 12,103,810 B1
(45) Date of Patent: Oct. 1, 2024

(54) SHAFT SAFETY VALVE SYSTEM

(71) Applicants: Michael Van Deurse, Norton, MA (US); Kale Geddis, Brookline, NH (US)

(72) Inventors: Michael Van Deurse, Norton, MA (US); Kale Geddis, Brookline, NH (US)

(73) Assignee: DOUBLE E COMPANY, LLC, West Bridgewater, MA (US)

( * ) Notice: Subject to any disclaimer, the term of this patent is extended or adjusted under 35 U.S.C. 154(b) by 304 days.

(21) Appl. No.: 17/747,074

(22) Filed: May 18, 2022

Related U.S. Application Data

(60) Provisional application No. 63/210,706, filed on Jun. 15, 2021.

(51) Int. Cl.
  *B65H 75/24* (2006.01)
  *F16K 15/20* (2006.01)

(52) U.S. Cl.
  CPC ........... *B65H 75/243* (2013.01); *F16K 15/20* (2013.01); *B65H 2553/10* (2013.01)

(58) Field of Classification Search
  CPC .............. B65H 75/2437; B65H 75/243; B65H 2553/10; F16K 15/20; Y10T 137/3584; Y10T 137/3631; Y10T 137/3693; Y10T 137/2724; B60C 29/06
  See application file for complete search history.

(56) References Cited

U.S. PATENT DOCUMENTS

| | | | |
|---|---|---|---|
| 510,215 A * | 12/1893 | Vauzelle | F16K 15/20 251/339 |
| 3,432,904 A | 3/1969 | Stewart | |
| 3,786,994 A * | 1/1974 | Kukes | F16K 15/20 141/38 |
| 5,305,784 A * | 4/1994 | Carter | B60C 29/064 285/305 |
| 5,746,243 A | 5/1998 | Franke | |
| 5,964,430 A * | 10/1999 | Coffey | B65H 75/2437 242/571.1 |
| 7,320,347 B2 * | 1/2008 | Ramsey | B60P 7/065 141/285 |
| D685,877 S | 7/2013 | Nemoto | |
| D745,638 S | 12/2015 | Hickman | |
| 10,208,865 B2 * | 2/2019 | Wang | F16K 15/20 |
| 10,245,911 B1 * | 4/2019 | Crymble | B60C 29/064 |
| 10,384,898 B2 * | 8/2019 | Yeh | B65H 19/126 |
| D883,914 S | 5/2020 | Johnson | |
| 11,719,351 B2 * | 8/2023 | Quintana | F04B 39/10 137/231 |

(Continued)

FOREIGN PATENT DOCUMENTS

KR    20010081908 A  *  8/2001
WO  WO-2010083830 A1 *  7/2010 ........... B65H 75/243

*Primary Examiner* — Jessica Cahill
(74) *Attorney, Agent, or Firm* — John P. McGonagle

(57) ABSTRACT

An improved shaft safety pneumatic valve system in combination with a pneumatic expanding core shaft, is provided. The valve system provides a threaded air valve with a disk threadingly engaging the threaded air valve and a corresponding adapter fitted onto an air gun and adapted to engage the threaded air valve via the threaded disk. The threaded disk acts as a shroud about the air valve preventing an operator's finger from entering the bearing tube aperture to release air from the air valve.

3 Claims, 8 Drawing Sheets

(56) References Cited

U.S. PATENT DOCUMENTS

2007/0152094 A1* 7/2007 Deacon .............. B65H 75/2437
   242/529
2012/0018565 A1* 1/2012 Weber ................ B65H 75/2437
   242/571.2

* cited by examiner

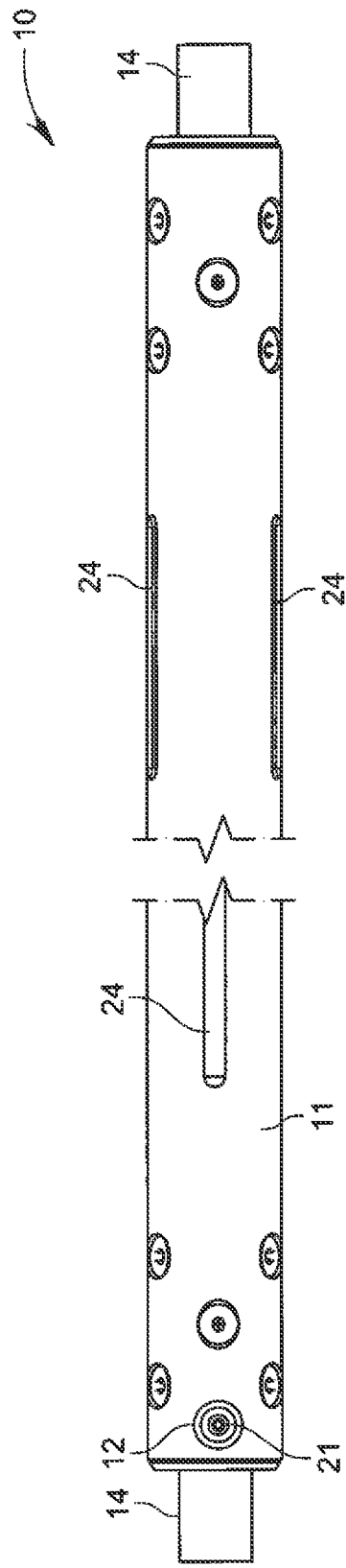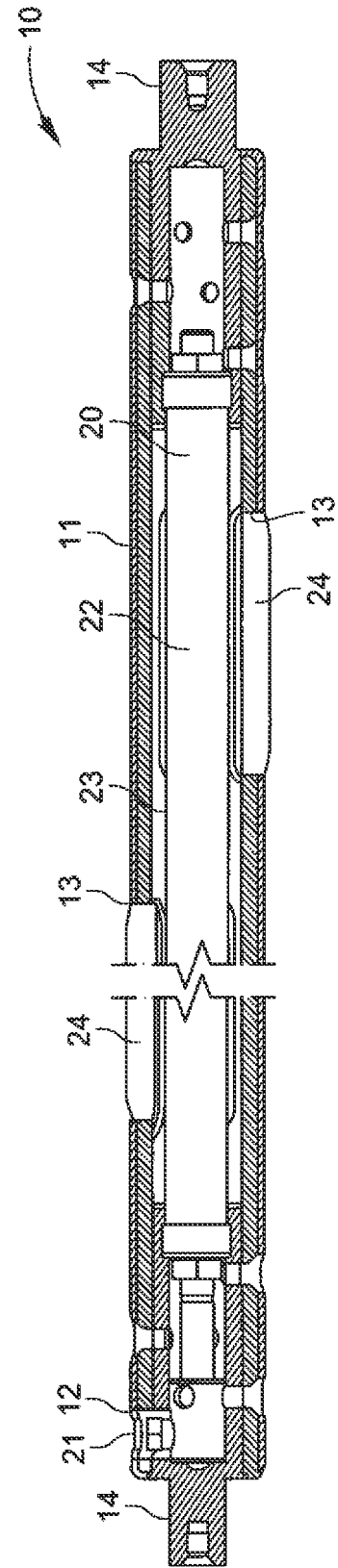

SHAFT SAFETY VALVE SYSTEM

BACKGROUND OF THE INVENTION

This invention relates to pneumatic core shafts, and in particular, to an improved pneumatic air valve and adapter for safely inserting and removing air from the pneumatic core shaft.

Pneumatic core shafts are expanding shafts for gripping and holding a core of a wound material roll. The shaft transmits torque to the roll of material from a motor, clutch or brake thereby winding, unwinding or stopping rotation of the core. The core shaft then engages and is driven by machine. The wound material can be any flexible web, e.g., paper, film, foil, nonwovens, and the like.

Pneumatic core shafts generally have a central air bladder or multiple air bladders within a bearing tube. Inflating the air bladder or bladders through an air valve forces attached bladder lugs through openings in the bearing tube. A typical bladder will be pressurized to 80 psi. The lugs grip and hold the internal surface of the core of a web material roll. Lugs may have different shapes, such as ovals, buttons, strips, leafs, and spirals, Some pneumatic core shafts have multiple bladders such as with strip and leaf lugs, The air valves are positioned within the bearing tube and accessed through an aperture in the bearing tube. Air is inserted into the air valve by means of an air gun. Air is reduced or released from air bladders by pressure exerted against the air valve. During air release operations it is not uncommon for operators to use a finger inserted into the bearing tube aperture against the air valve to release air. It is also not uncommon for loads on the bearing tube or the bladder itself to shift while air is being released from the air bladder. All too often, the tip of the operator's finger is injured or even taken off.

SUMMARY OF THE INVENTION

The present invention overcomes safety problems with releasing air from air valves in pneumatic core shafts. The present invention provides a safety system comprising a threaded air valve in place of the traditional pneumatic core shaft air valve, a disk threadingly engaging the threaded air valve and the bearing tube aperture, and a corresponding adapter fitted onto an air gun and adapted to engage the threaded air valve via the threaded disk. The threaded disk acts as a shroud about the air valve preventing an operator's finger from entering the bearing tube aperture to release air from the air valve.

These together with other objects of the invention, along with various features of novelty which characterize the invention, are pointed out with particularity in the disclosure attached hereto and forming a part of this disclosure. For a better understanding of the invention, its operating advantages and the specific objects attained by its uses, reference should be made to the accompanying drawings and descriptive matter in which there is illustrated a preferred embodiment of the invention.

BRIEF DESCRIPTION OF THE DRAWINGS

FIG. 1 is a plan view of a pneumatic core shaft with a single bladder.

FIG. 2 is a cross-sectional view of the pneumatic core shaft of FIG. 1 along the shaft longitudinal axis.

DETAILED DESCRIPTION OF INVENTION

Figure 3:
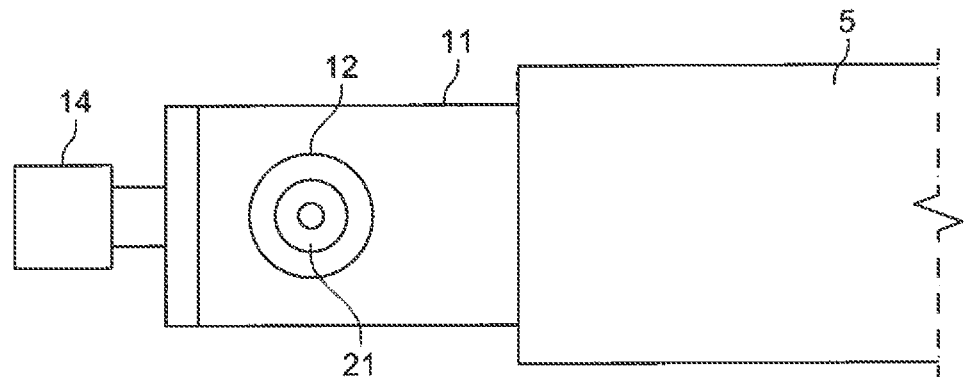
FIG. 3 is a view of the pneumatic inflation valve through an aperture in the bearing tube.

Referring to the drawings in detail wherein like elements are indicated by like numerals there is shown, especially in FIGS. 1 and 2, a pneumatic expanding core shaft 10 comprised of a hollow, cylindrical bearing tube 11 with one or more air bladders 20 contained within. The air bladder 20 has a pneumatic inflation valve 21 joined in operative engagement with an air bladder interior 22, said pneumatic inflation valve adapted to insert or release air into the bladder. The pneumatic inflation valve 21 is accessed through a pneumatic inflation valve aperture 12 formed in the bearing tube 11. Each air bladder 20 has an exterior surface 23 driving one or more lugs 24 loosely held and protruding through lug apertures 13 in the bearing tube 11. The lugs 24 engage a roll 5 of wound web material. The shaft 10 has two ends 14 which may be journaled into a machine, engaged with two safety chucks, or engaged by a cam-follower type bearing, or other drive coupling method.

Figure 4:
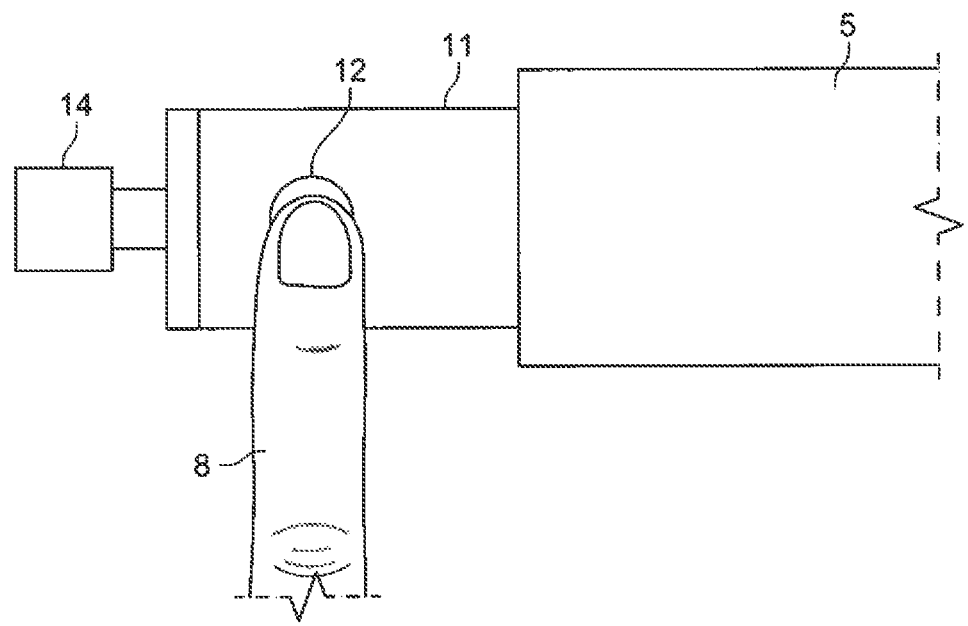
FIG. 4 is a view of an operator's finger pressing the pneumatic inflation valve of FIG. 3.

Referring more particularly to FIGS. 3 and 4, there is shown a close up view of a bearing tube inflation valve aperture 12 with the pneumatic inflation valve 21 visible within the bearing tube 11, said bearing tube having a load comprised of a roll of wound web material 5. FIG. 4 illustrates a typical operator finger 8 pressing down within the bearing tube aperture 12 against the pneumatic inflation valve 21 to release air from the bladder 20 (not shown). Shifts in the bearing tube 11, the air bladder 20 and/or the load 5, can often injure the operator's finger 8.

Referring more particularly to FIGS. 5-12, there is shown a shaft safety valve system comprised of a threaded air valve 30 in place of the traditional pneumatic core shaft air valve 21, a disk 40 threadingly engaging the threaded air valve 30 and the bearing tube aperture 12, and a corresponding adapter 50 fitted onto an air gun 80 and adapted to engage the threaded air valve 30 via the threaded disk 40. See FIG. 12. The threaded disk 40 acts as a shroud about the air valve 30 preventing an operator's finger 8 from entering the bearing tube aperture 12 to release air from the air valve 30.

Figure 10A:
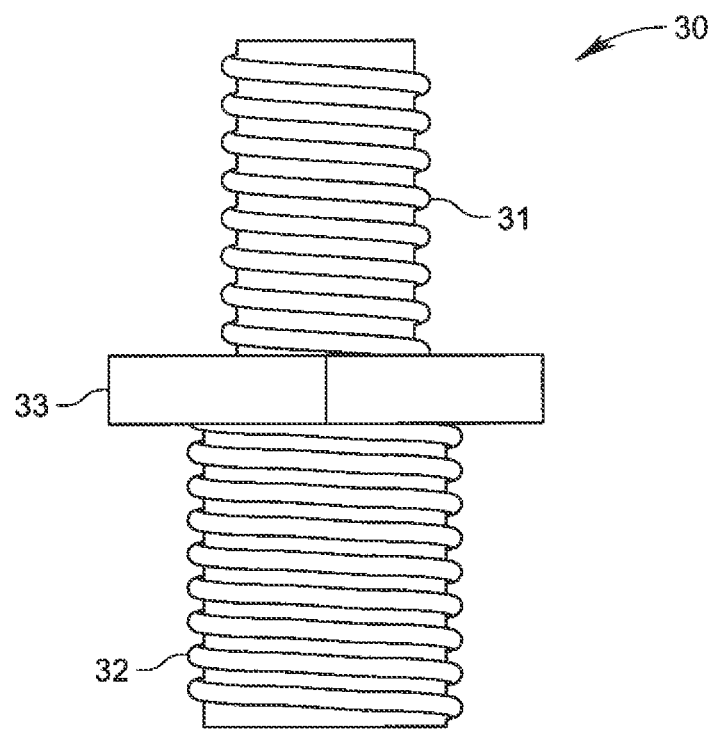
FIG. 10A is a side view of the invention pneumatic inflation valve.
Figure 10B:
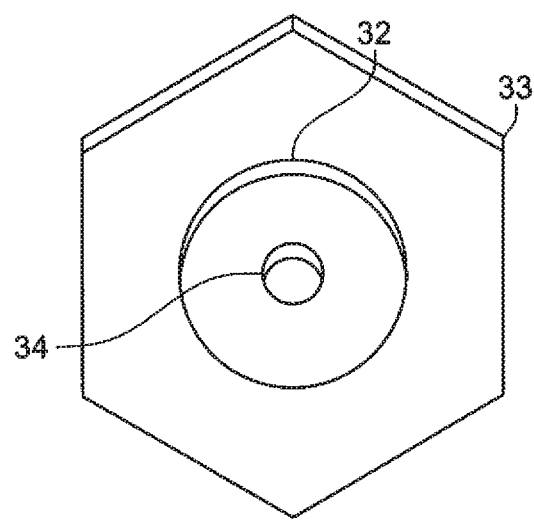
FIG. 10B is a bottom view of the invention pneumatic inflation valve.
Figure 10C:
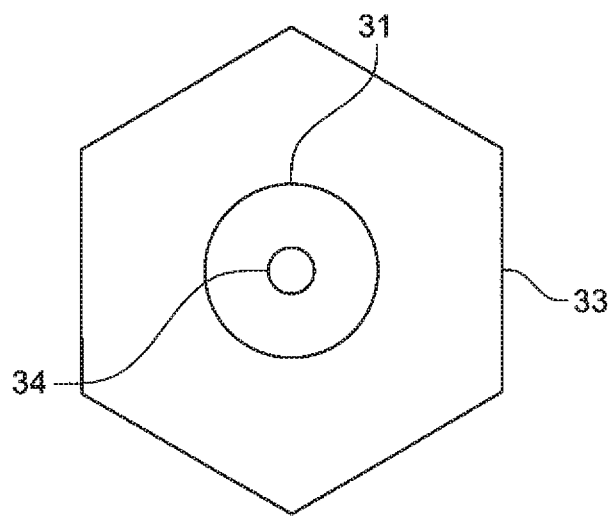
FIG. 10C is a top view of the invention pneumatic inflation valve.
Figure 11:
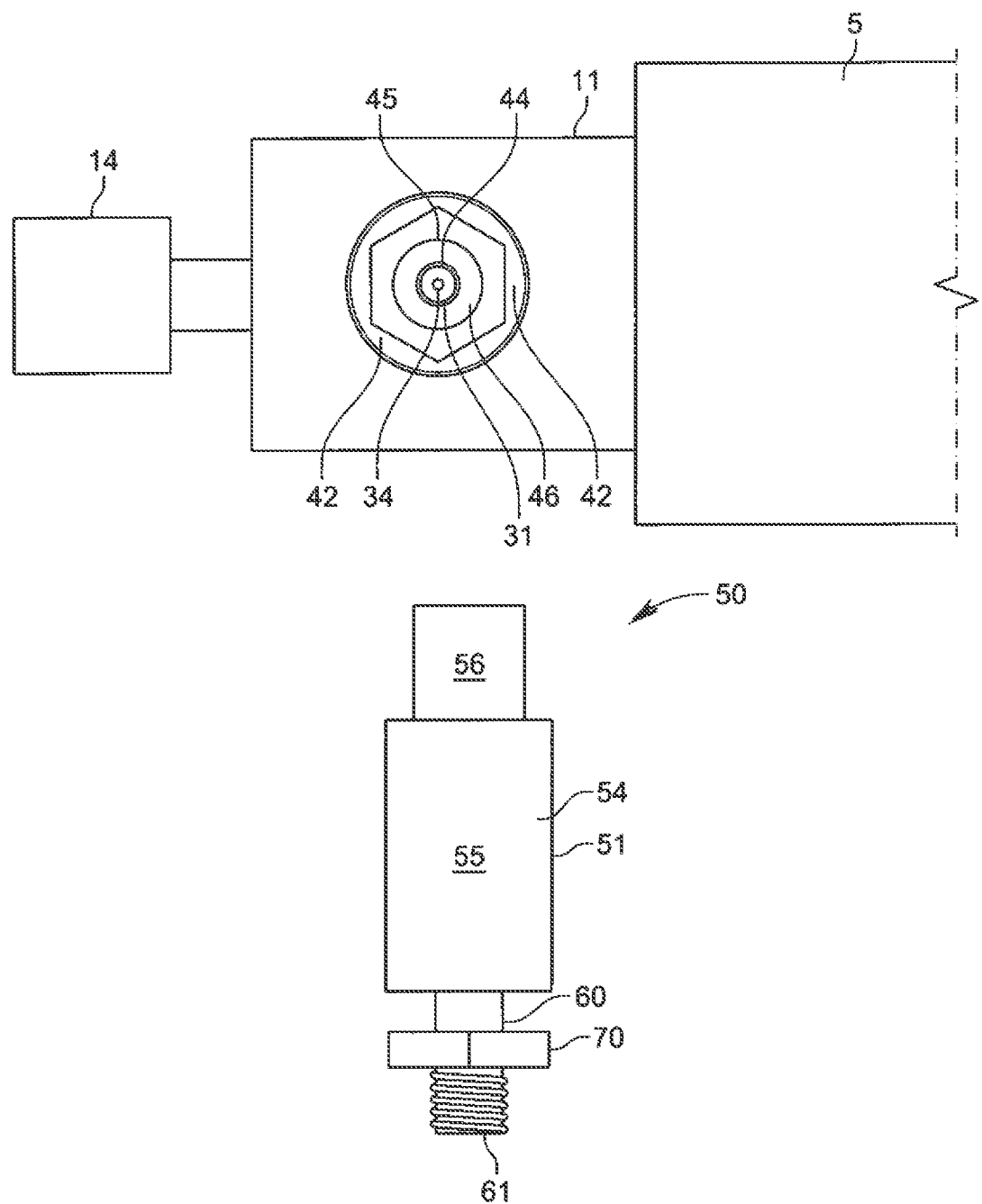
FIG. 11 is a view of the shroud installed in the bearing tube aperture for the pneumatic inflation valve and adjacent air gun adapter.
Figure 12:
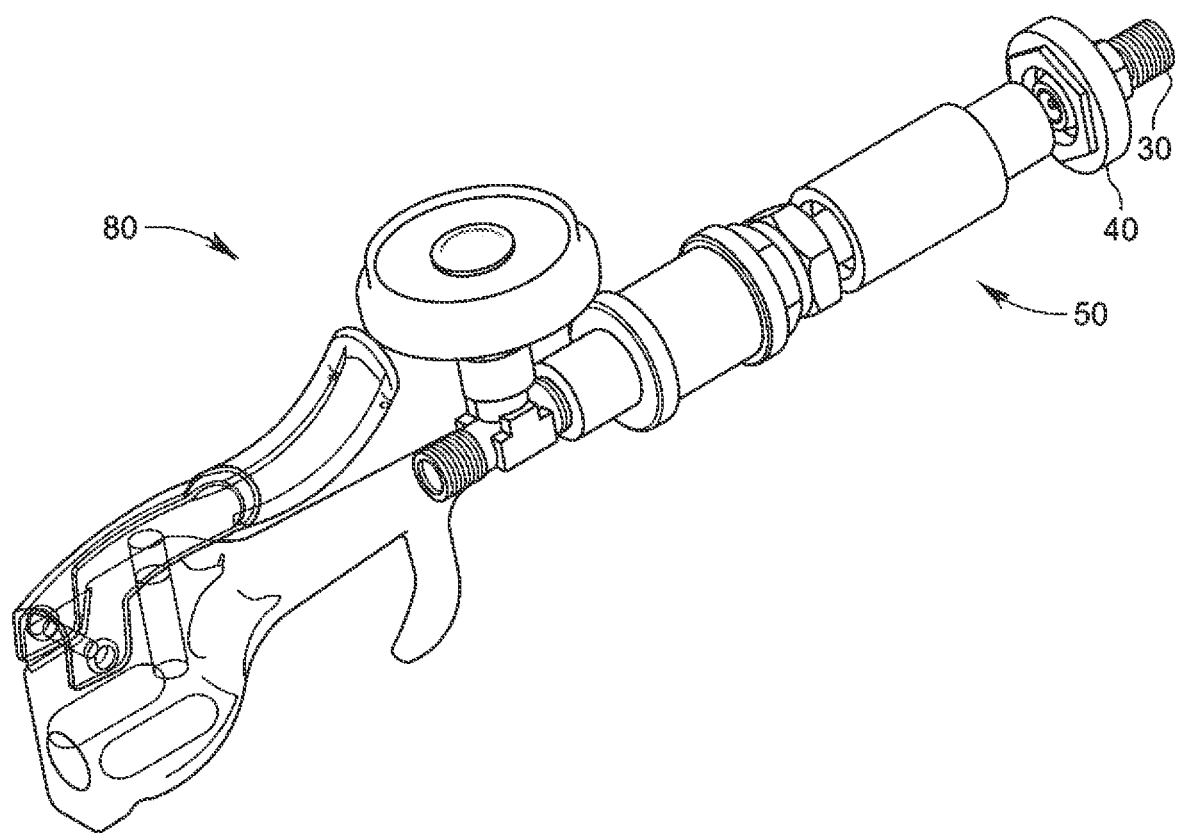
FIG. 12 is a perspective view of an air gun, adapter and pneumatic inflation valve.

As may be most clearly seen in FIGS. 10A-10C, the invention air valve 30 is similar to a truck tube air valve. The air valve is cylindrical and is comprised of a top threaded section 31 and a bottom threaded section 32 separated at an approximate midpoint by a hex nut 33. The bottom section has a wider diameter than the top section. The bottom section 32 is adapted to being inserted into the air bladder 20. The air valve 30 has an interior valve 34 whose manipulation moves air into and out of the air bladder 20.

Figure 8:
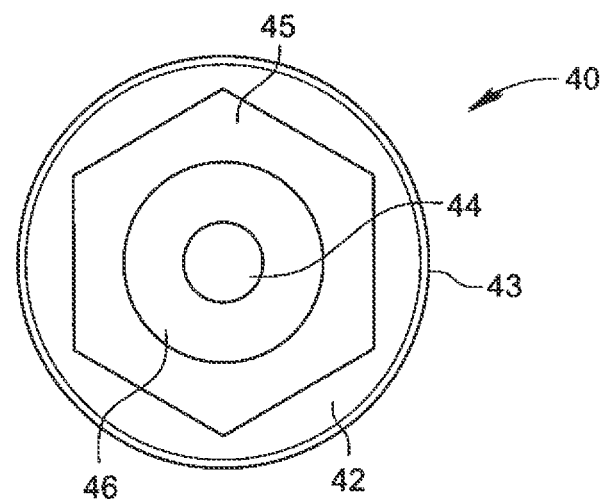
FIG. 8 is top view of the pneumatic inflation valve disk.
Figure 9:
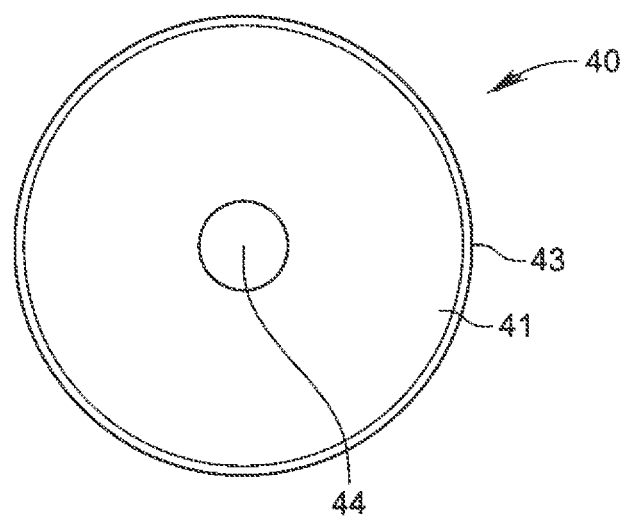
FIG. 9 is a bottom view of the disk shown in FIG. 8

As may be most clearly seen in FIGS. 8 and 9, the invention disk 40 has a flat bottom 41, a top 42 and a side wall 43. The disk has a central, threaded aperture 44 extending through the disk top and bottom. The disk central threaded aperture 44 corresponds in diameter to the threaded air valve top section 31 for threading engagement. The disk top 42 has a hexagonal protrusion 45 with a central annular channel 46 formed about the disk central aperture 44. The bearing tube inflation valve aperture 12 is threaded. The disk diameter corresponds to the diameter of the bearing tube inflation valve aperture diameter. The threaded disk aperture 44 threadingly engages the threaded air valve top section 31. The disk hexagonal protrusion 45 provides means for wrench engagement during installation.

Figure 5:
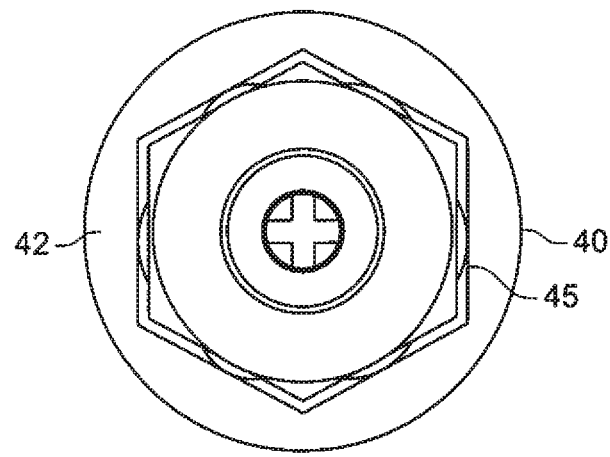
FIG. 5 is a top view of the invention system.
Figure 6:
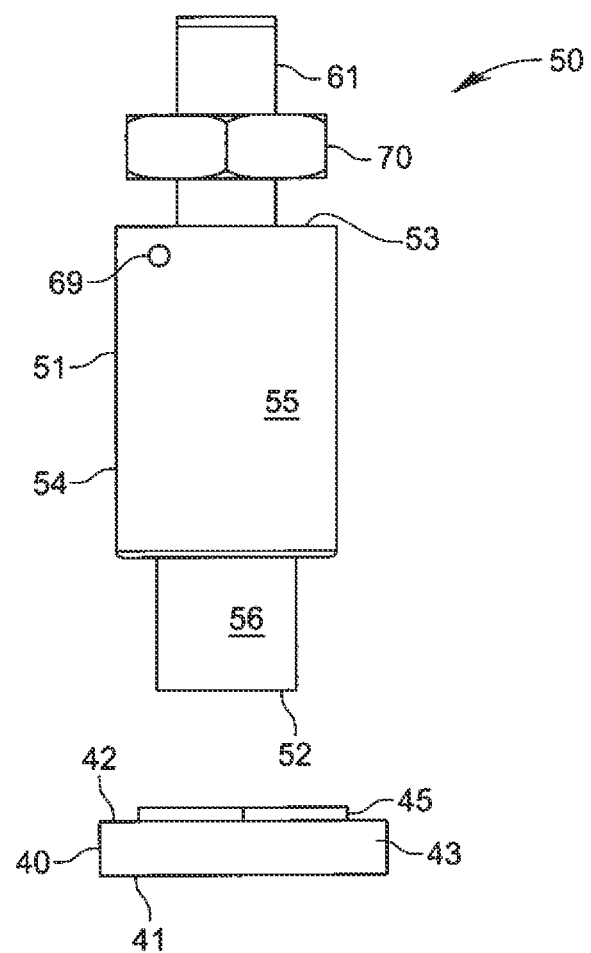
FIG. 6 is a plan view of the invention system.
Figure 7:
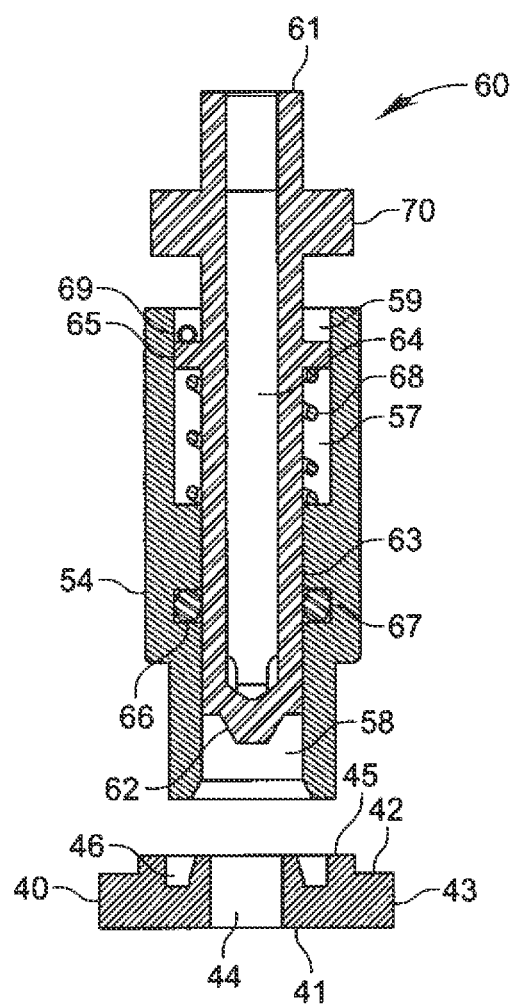
FIG. 7 is a cross-sectional view of the system shown in FIG. 6.

As may be most clearly seen in FIGS. 5-7, the adapter 50 has a hollow cylindrical sleeve 51 having an open bottom 52 and an open top 53, with a side wall 54 interconnecting said bottom and top, said top, bottom and side wall defining a sleeve interior 57. The side wall 54 is divided into a top section 55 and a bottom section 56. The diameter of the bottom section 56 is less than the diameter of the top section. The sleeve interior 57 is divided into a lower interior annular opening 58 and an upper interior annular opening 59, said upper interior annular opening having a diameter greater than the diameter of the lower interior annular opening. The sleeve lower interior annular opening 58 has an annular channel 66 formed therein, said annular channel adapted to hold an O-ring 67. The diameter of the sleeve bottom section 56 corresponds to the diameter of the disk central annular channel 46.

The adapter 50 is further comprised of a cylindrical valve body 60. The valve body has a top 61, a bottom 62 and a cylindrical side wall 63 connecting said valve body top and valve body bottom, said top, bottom and side wall defining a valve body interior 64. The valve body side wall has an annular protrusion 65, said annular protrusion adapted to slide within the sleeve upper interior annular opening 59. The valve body 60 is encased in a compression spring 68 within the sleeve interior upper annular section 59 beneath the valve body annular protrusion 65. A spring pin 69 is inserted through the sleeve side wall top section into the upper interior annular opening 59 above the valve body annular protrusion 65. The valve body top 61 may be threaded and may have a hex nut 70, both providing means to engage an air gun (not shown).

In operation the invention air valve 30 replaces the traditional air bladder air valve. The disk 40 threadingly engages the air valve top section. The adapter 50 is the means by which an air gun 80 engages the air valve 30. The sleeve bottom 52 engages the disk central annular channel 46 and the valve body bottom 62 engages the threaded air valve interior valve 34.

It is understood that the above-described embodiments are merely illustrative of the application. Other embodiments may be readily devised by those skilled in the art, which will embody the principles of the invention and fall within the spirit and scope thereof.

We claim:

1. An improved shaft safety pneumatic valve system in combination with a pneumatic expanding core shaft having a hollow, cylindrical bearing tube with an air bladder contained within, said air bladder having a cylindrical pneumatic inflation valve joined in operative engagement with an air bladder interior, said pneumatic inflation valve adapted to insert or release air into the air bladder, said pneumatic inflation valve being accessed through a pneumatic inflation valve aperture formed in the bearing tube, said air bladder having an exterior surface driving one or more lugs loosely held and protruding through corresponding lug apertures in the bearing tube, said lugs adapted to engage a roll of wound web material on and about said bearing tube, wherein said cylindrical pneumatic inflation valve has a top threaded section and a bottom threaded section separated at an approximate midpoint by a nut, said bottom section adapted to being inserted into the air bladder, said pneumatic inflation valve having an interior valve whose manipulation moves air into and out of the air bladder, comprising:

a disk threadingly engaging the pneumatic inflation valve top threaded section, said disk having a flat bottom, a top and side wall, said disk having a central threaded aperture extending through the disk top and bottom, said disk central threaded aperture corresponding in diameter to the pneumatic inflation valve top threaded section for threading engagement, said disk top having a nut protrusion formed therein with a central annular threaded channel formed therein, said disk having an external diameter less than a diameter of the bearing tube inflation valve aperture diameter; and an adapter fitted onto an air gun and adapted to engage the pneumatic inflation valve through the disk central threaded aperture and nut protrusion central annular threaded channel, said adapter having a hollow cylindrical sleeve with an open bottom and an open top, and a side wall interconnecting said bottom and top, said top, bottom and side wall defining a sleeve interior, said side wall divided into a top section and a bottom section, said bottom section having a diameter less than the top section, said sleeve interior divided into a lower interior annular opening and an upper interior annular opening, said upper interior annular opening having a diameter greater than the diameter of the lower interior annular opening, said sleeve lower interior annular opening having an annular channel formed therein, said annular channel adapted to hold a O-ring, the said sleeve bottom section having a diameter corresponding to the diameter of the disk nut protrusion central threaded channel.

2. An improved shaft safety pneumatic valve system as recited in claim 1, wherein:

the adapter is further comprised of a cylindrical valve body having a top, a bottom and a cylindrical side wall connecting said valve body top and valve body bottom, said top, bottom and side wall defining a valve body interior, said valve body side wall having an annular protrusion, said annular protrusion adapted to slide within the sleeve upper interior annular opening, said valve body encased in a compression spring within the sleeve interior upper annular section beneath the valve body annular protrusion, wherein a spring pin is inserted through the sleeve side wall top section into the upper interior annular opening above the valve body annular protrusion; wherein the sleeve bottom section engages the disk nut protrusion central annular threaded channel and the valve body bottom engages the threaded air valve interior valve.

3. An improved shaft safety pneumatic valve system as recited in claim 2, wherein:

the disk top nut protrusion has a hexagonal shape providing means for wrench engagement during an installation.

* * * * *